ROTARY DUCTOR FOR PRINTING PRESSES

Filed May 22, 1948 13 Sheets-Sheet 1

INVENTORS
HARRY W. FAEBER
ORVILLE V. DUTRO
LYLE DUTRO

BY Campbell, Brumbaugh & Free
their ATTORNEYS

ROTARY DUCTOR FOR PRINTING PRESSES

Filed May 22, 1948 13 Sheets-Sheet 2

INVENTORS
HARRY W. FAEBER
ORVILLE V. DUTRO
LYLE DUTRO
BY
Campbell, Brumbaugh & Free
their ATTORNEYS Jan. 29, 1952 H. W. FAEBER ET AL 2,583,639

ROTARY DUCTOR FOR PRINTING PRESSES

Filed May 22, 1948 13 Sheets-Sheet 3

INVENTORS
HARRY W. FAEBER
ORVILLE V. DUTRO
LYLE DUTRO
BY
Campbell, Brumbaugh & Free
their ATTORNEYS Jan. 29, 1952 H. W. FAEBER ET AL 2,583,639

ROTARY DUCTOR FOR PRINTING PRESSES

Filed May 22, 1948 13 Sheets-Sheet 4

INVENTORS
HARRY W. FAEBER
ORVILLE V. DUTRO
LYLE DUTRO

BY Campbell, Brumbaugh & Free their ATTORNEYS

INVENTORS
HARRY W. FAEBER
ORVILLE V. DUTRO
LYLE DUTRO
BY
Campbell, Brumbaugh & Free
their ATTORNEYS

ROTARY DUCTOR FOR PRINTING PRESSES

INVENTORS
HARRY W. FAEBER
ORVILLE V. DUTRO
LYLE DUTRO
BY
Campbell, Brumbaugh & Free
their ATTORNEYS Jan. 29, 1952 H. W. FAEBER ET AL 2,583,639

ROTARY DUCTOR FOR PRINTING PRESSES

Filed May 22, 1948 13 Sheets-Sheet 7

INVENTORS
HARRY W. FAEBER
ORVILLE V. DUTRO
LYLE DUTRO
BY
Campbell, Brumbaugh & Free
their ATTORNEYS Jan. 29, 1952 H. W. FAEBER ET AL 2,583,639

ROTARY DUCTOR FOR PRINTING PRESSES

Filed May 22, 1948 13 Sheets-Sheet 8

INVENTORS
HARRY W. FAEBER
ORVILLE V. DUTRO
LYLE DUTRO
BY
Campbell, Brumbaugh & Free
their ATTORNEYS INVENTORS
HARRY W. FAEBER
ORVILLE V. DUTRO
LYLE DUTRO
BY
Campbell, Brumbaugh & Free
their ATTORNEYS INVENTORS
HARRY W. FAEBER
ORVILLE V. DUTRO
LYLE DUTRO
BY
Campbell, Brumbaugh & Free
their ATTORNEYS Jan. 29, 1952 H. W. FAEBER ET AL 2,583,639

ROTARY DUCTOR FOR PRINTING PRESSES

Filed May 22, 1948 13 Sheets-Sheet 11

INVENTORS
HARRY W. FAEBER
ORVILLE V. DUTRO
LYLE DUTRO
BY Campbell, Brumbaugh & Free
their ATTORNEYS INVENTORS
HARRY W. FAEBER
ORVILLE V. DUTRO
LYLE DUTRO
BY
Campbell, Brumbaugh & Free
their ATTORNEYS ROTARY DUCTOR FOR PRINTING PRESSES
Filed May 22, 1948 13 Sheets-Sheet 13
FIG. 15
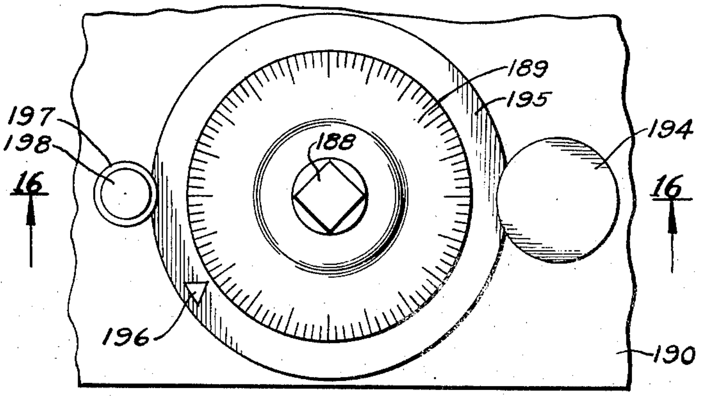
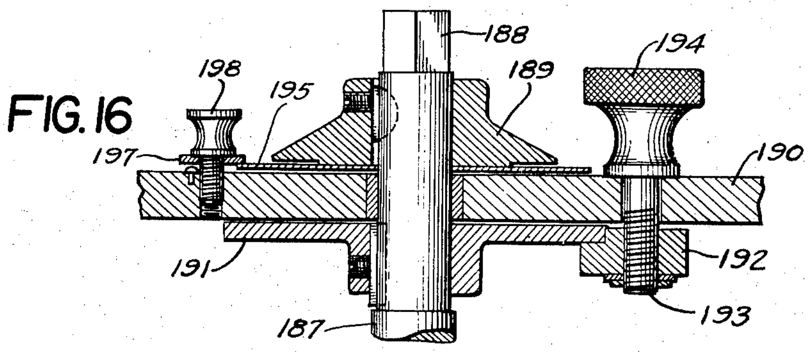
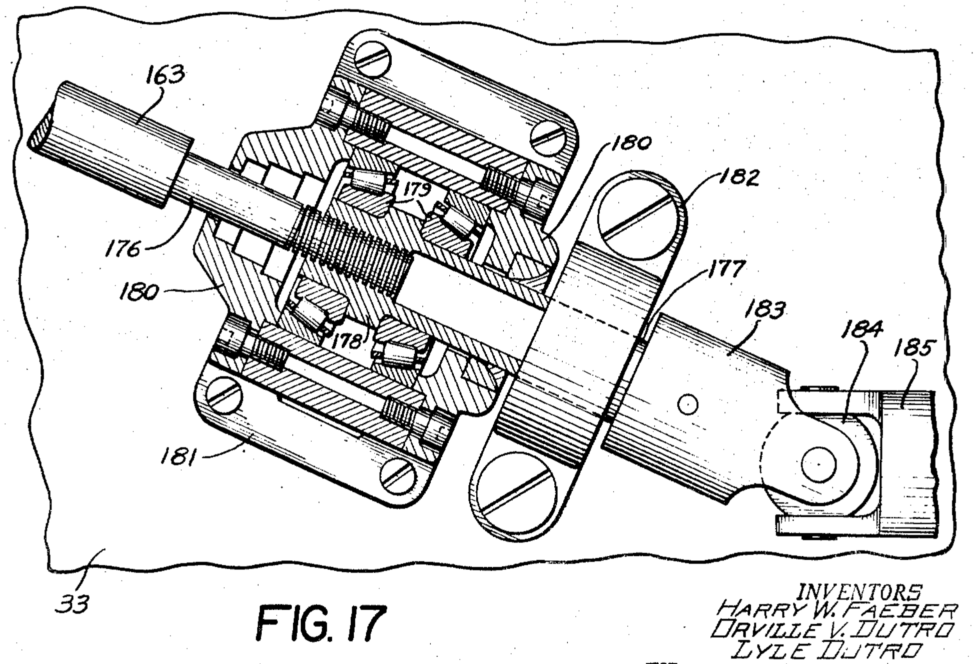
FIG. 16 FIG. 17
INVENTORS
HARRY W. FAEBER
ORVILLE V. DUTRO
LYLE DUTRO
BY
Campbell, Brumbaugh & Free
their ATTORNEYS Patented Jan. 29, 1952

2,583,639

UNITED STATES PATENT OFFICE 2,583,639

ROTARY DUCTOR FOR PRINTING PRESSES

Harry W. Faeber, Larchmont, N. Y., and Orville V. Dutro and Lyle Dutro, La Canada, Calif., assignors to Time, Incorporated, New York, N. Y., a corporation of New York Application May 22, 1948, Serial No. 28,564

3 Claims. (Cl. 101—349)

The present invention relates to inking mechanisms for printing presses and embodies more specifically an improved form of mechanism by means of which ink or other liquid may be supplied to the printing surface in such fashion as to insure a desirably uniform film of ink or other liquid over all portions of the printing surface.

A further object of the invention is to provide mechanism of the above character wherein the supply of ink or other liquid furnished to the printing surface may be arrested during periods when the machine is not printing, thus preventing the inking system from becoming overloaded with liquid at such times.

A further object of the invention is to provide a mechanism of the above character in which the entire liquid supply system may be moved to and from operating and retracted positions, in the latter of which access may be had to the printing machine as well as the liquid distribution system.

Yet another object of the invention is to provide, in liquid distribution systems of the above character, an improved form of ductor device by means of which the transfer of liquid from the fountain roll to the liquid distribution system may be effectively controlled.

Further objects of the invention will be apparent as it is described in greater detail in connection with the accompanying drawings, wherein Figure 1 is a plan view of an ink distribution system constructed in accordance with the present invention;

Figure 15 is a view in end elevation showing the remote control mechanism of Figure 4, the view being taken on the plate 15—15 of Figure 4 and looking in the direction of the arrows;

Figure 16 is a view in section, taken on the line 16—16 of Figure 15, and looking in the direction of the arrows;

Figure 17 is an enlarged view, partly in section and illustrating the manner in which the remote control mechanism of Figure 4 is journaled.

Figure 2:
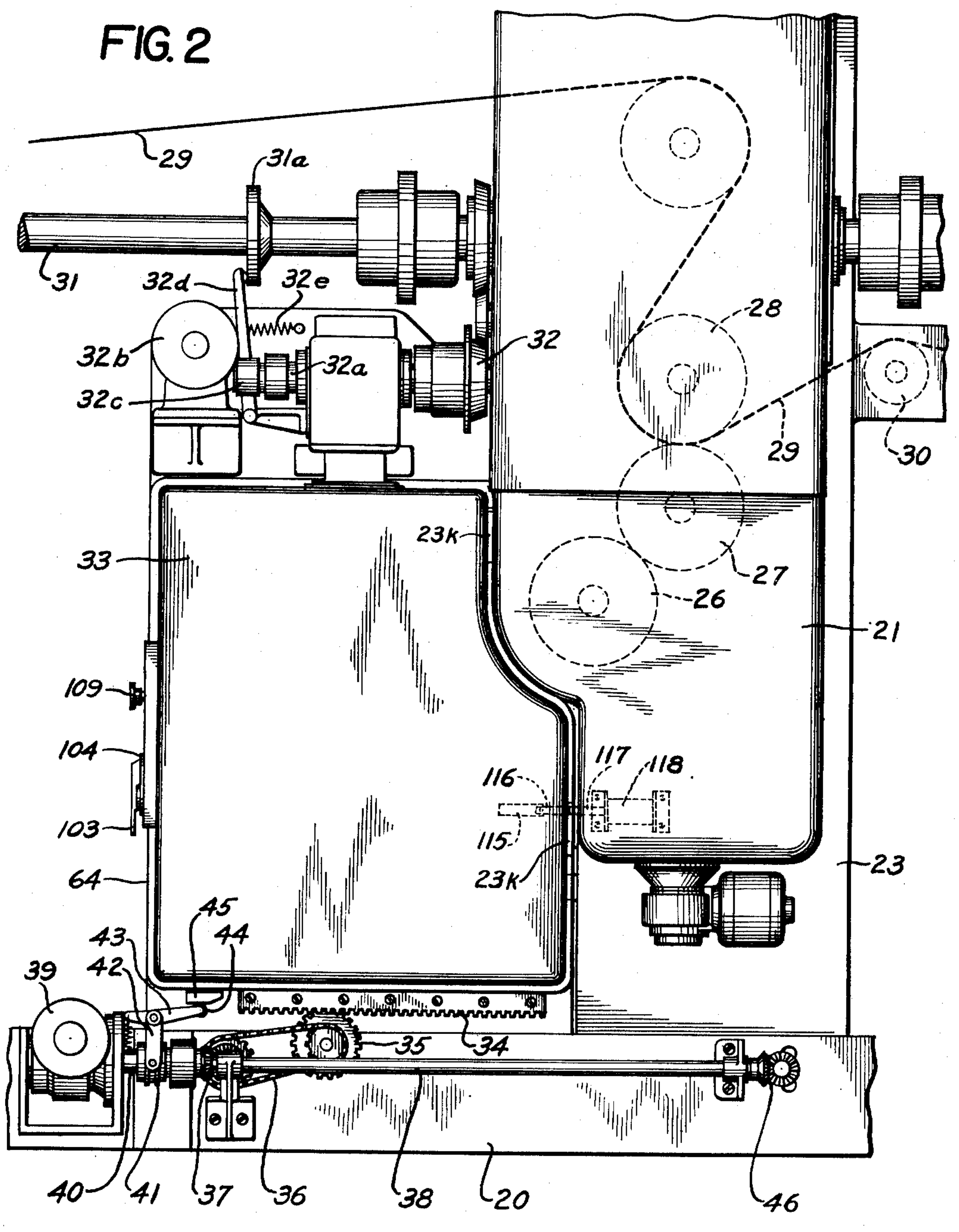
Figure 2 is a view in end elevation, taken on the plane indicated by the line 2—2 of Figure 1, and showing the carriage or mounting for the ink distribution system as well as the adjacent portions of a printing machine in which the present invention has been embodied.

Referring to the above drawings and particularly to Figure 2, a portion of a printing machine is illustrated as being provided with a base frame 20 upon which a printing unit 21 is mounted. The printing unit is formed of side frame members 22 and 23 and are provided with bearings 24 and 25 within which the shaft of a plate or form cylinder 26 is journaled. In the description of the invention herein an offset printing machine is described although it will be readily understood that the present invention is equally applicable to printing machines of the so-called letterpress type.

Also journaled in the side frames 22 and 23 is a blanket cylinder 27 (as illustrated schematically in Figure 2) as well as an impression cylinder 28. The continuous web of paper 29 is fed between the blanket and impression cylinders from a suitable guide roller 30, the details of the above mechanism forming no part of the present invention.

Power is supplied to the printing unit by means of a main drive shaft 31, from which shaft power take-off mechanisms are provided for operating the ink distribution system. For example, in Figure 2 there is illustrated a friction clutch mechanism 32 for furnishing power to a power shaft **32*a* upon a carriage 33 that is movably mounted upon the base frame 20. The power shaft 32*a* is also driven by an auxiliary motor 32*b* through a clutch 32*c* actuated by an arm 32*d* which is adapted to be engaged by a flange 31*a* on the shaft 31. This flange normally holds the clutch 32*c* in disengaged position. When the carriage 33 moves away from its operating position, as shown in Figure 2, the clutch 32 is disengaged and the clutch 32*c* is moved into engaged position by the spring 32*e***.

Within the carriage 33 the entire ink distribution system of the printing press is received, and the carriage is moved to and from its operative position (as illustrated in Figure 2) by means of a rack 34 which is mounted on the carriage and a drive pinion 35 which is journaled in the base frame and driven by means of a sprocket drive chain 36 which receives power from a bevel gear set 37 mounted upon a drive shaft 38. Drive shaft 38 is driven by an electric motor 39 which operates a shaft section 40 that is adapted to be coupled to shaft 38 by means of a slidable clutch 41. Clutch 41 is controlled by a pivoted yoke 42 provided with a crank arm 43 having a roller 44 that engages a cam plate 45 mounted upon the lower portion of the carriage 33. As the carriage 33 moves into its final operating position, the cam 45 causes the clutch 41 to be disengaged, and the carriage 33 is thus no longer moved by the motor 39. At such time hydraulic lock-up mechanism is operated to lock the carriage in its operating position.

Figures 14, 18:
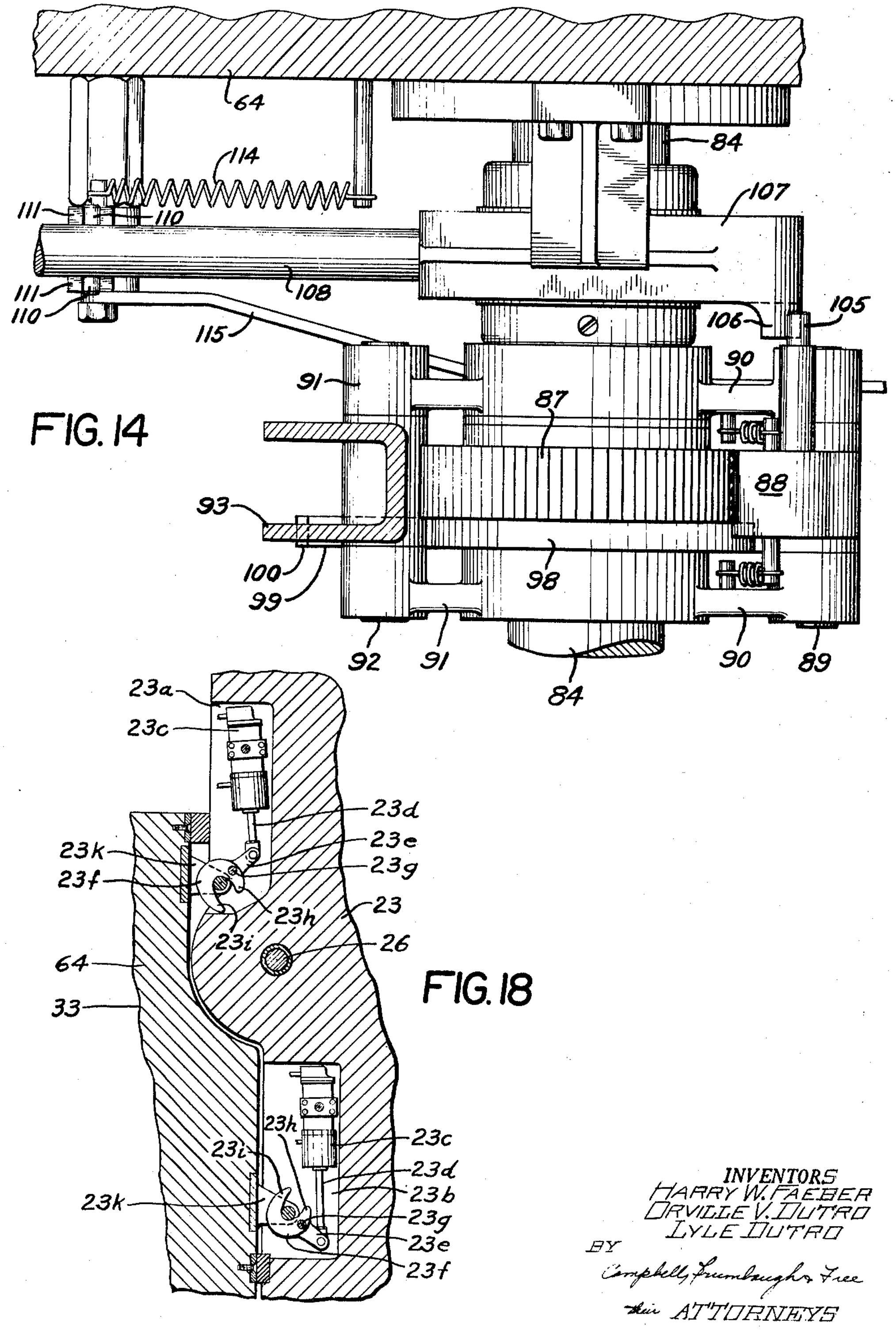
Figure 14 is a view in section, taken on the line 14—14 of Figure 10, and looking in the direction of the arrows.
Figure 18 is a view in section, taken on line 18—18 of Figure 1, and looking in the direction of the arrows.

For example, in Figure 18 the side frame 23 is provided with upper and lower recesses **23*a* and 23*b*. In each recess a fluid cylinder 23*c* is pivotally mounted and provided with a piston and rod 23*d* which is pivoted to an arm 23*e* of a hook 23*f* which is pivoted at 23*g*. The hook is provided with an opening jaw 23*h* and a closing jaw 23*i*, both of which are adapted to engage a bracket 23*k* on the ink carriage 33. When the piston rod moves into the cylinder the closing jaw 23*i* engages bracket 23*k* and clamps the carriage firmly in closed position. Upon movement in the opposite direction, the opening jaw 23*h*** engages the bracket to force the bracket and carriage away from operating position.

For example, hydraulically actuated pistons having hooks for engaging lugs on the carriage 33 may be provided, the fluid pressure for actuating the pistons being furnished from any suitably controlled source of pressure.

The shaft 38 is also provided with a bevel gear set 46 which may be hand-operated in order that the carriage 33 may be manually actuated, if desired.

Figure 3:
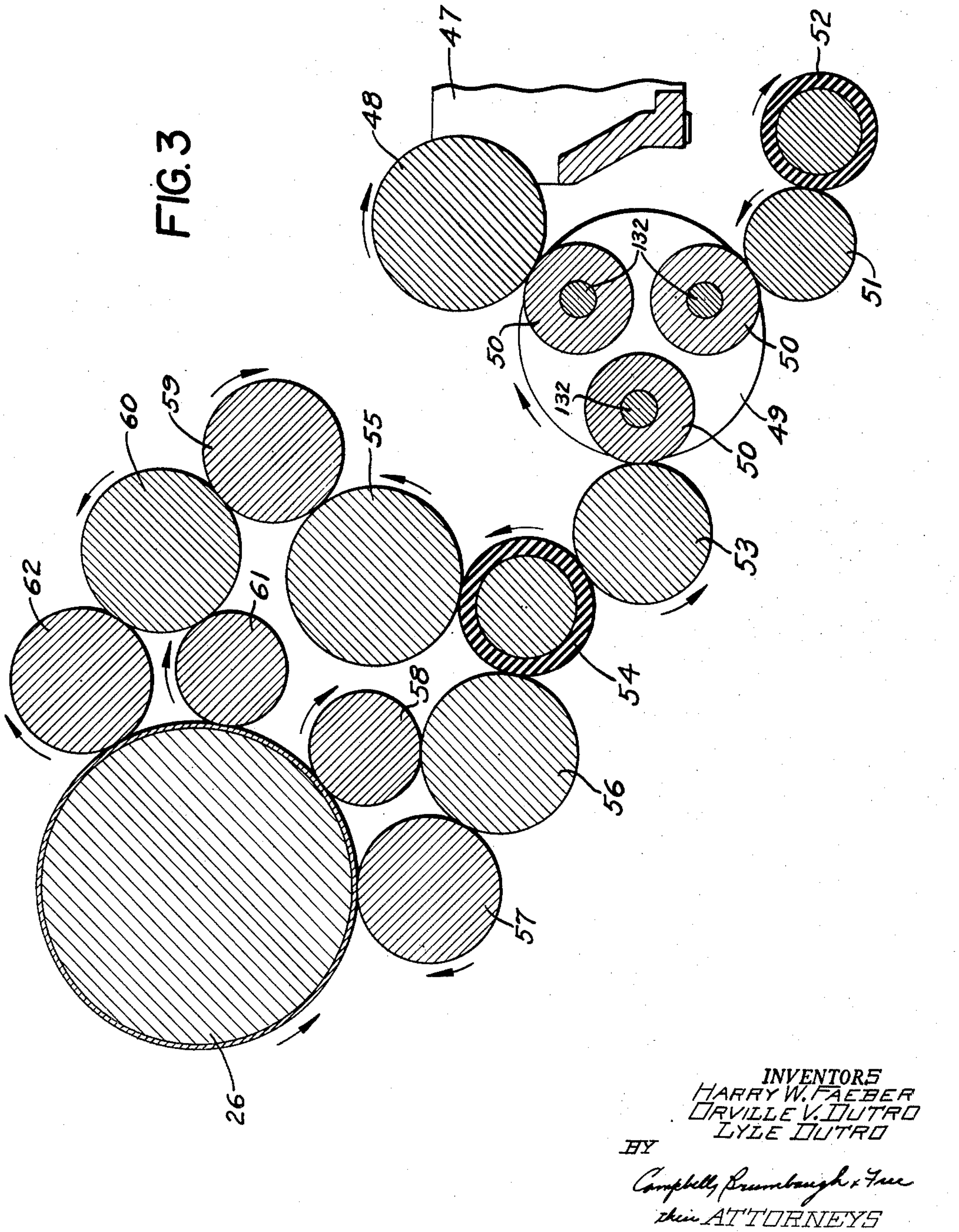
Figure 3 is an enlarged view in transverse vertical section, taken on the line 3—3 of Figure 1, and looking in the direction of the arrows.

Turning now to the details of the ink distribution system mounted within the carriage 33, the system is illustrated diagrammatically in Figure 3, wherein the plate or form cylinder 26 is illustrated at the left-hand end of the figure as being the surface to which ink is supplied by the ink distribution system of the present invention. The source of ink is a fountain, to be later described, mounted upon a support 47. Fountain support 47 carries fountain ink roll 48 which receives ink from the fountain and rotates in the direction indicated by the arrow. A rotatable ductor 49, the details of which will be described hereinafter, rotates in the direction of the arrow of Figure 3, and is provided with a plurality of ductor rolls 50. These rolls contact the ink roll 48 and, in their continued rotation, move into operative relationship with respect to a sub-distribution system comprising a reciprocating roller 51 which runs in continual contact with a rubber or similarly coated roller 52. The sub-distribution system serves to smooth out and render more uniform the coating of ink on the ductor rolls 50. Continued rotation of the ductor 49 brings the ductor rolls 50 into contact with a swing roll 53 which is preferably formed with a steel or similar surface. The swing roll 53 runs in contact with a rubber coated roll 54 which furnishes ink to vibrator rolls 55 and 56. Vibrator roll 56 runs in contact with form rolls 57 and 58 which furnish the ink to the form cylinder 26. Vibrator roll 55 also runs in contact with a steel or similar roll 59 which furnishes ink to vibrator roller 60, which in turn, furnishes ink to the form rolls 61 and 62.

Figure 1:
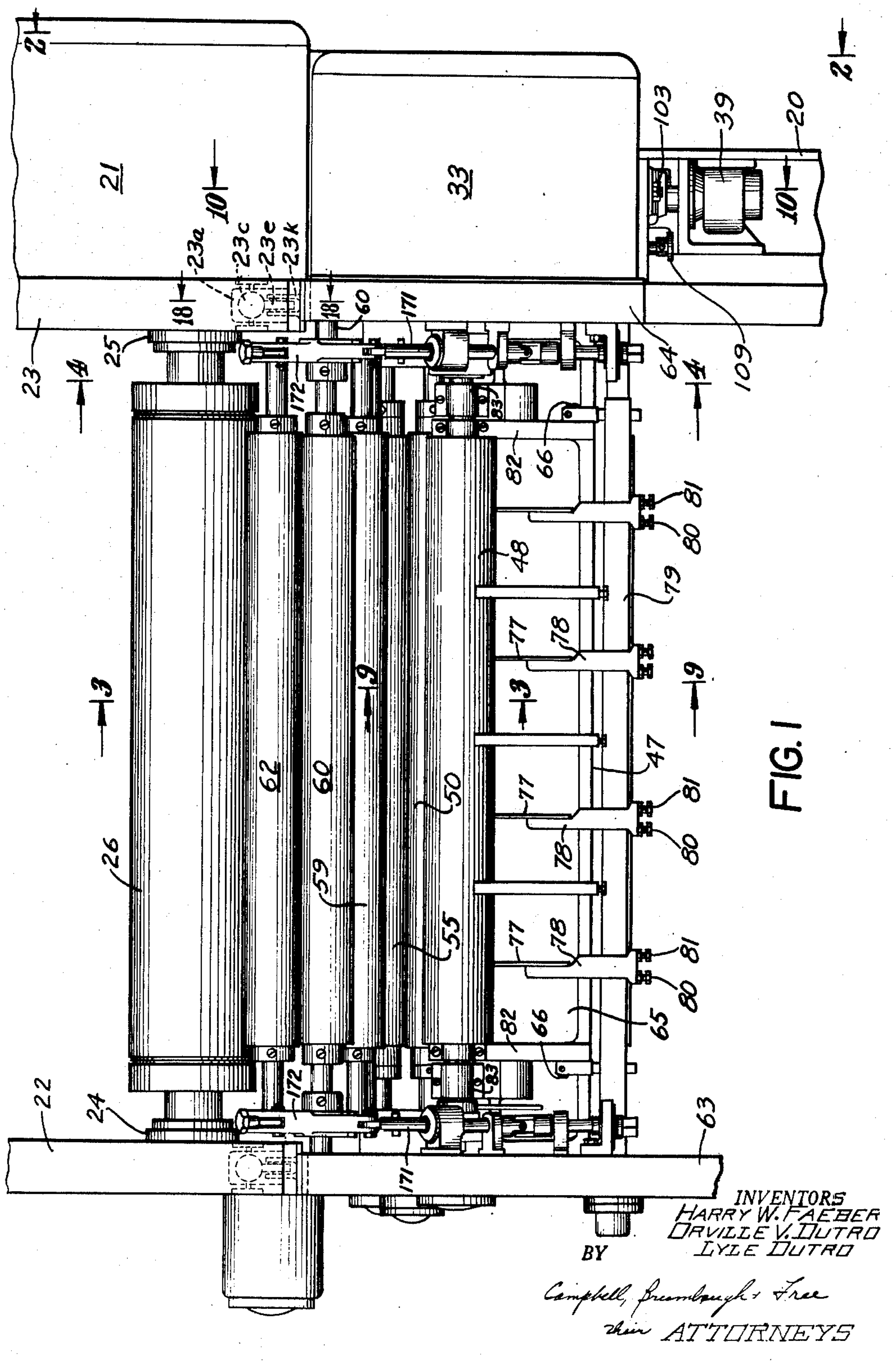

As illustrated in Figure 1, the carriage 33 is provided with end walls 63 and 64 within which the various ink distribution rollers above described are journaled.

Figure 5:
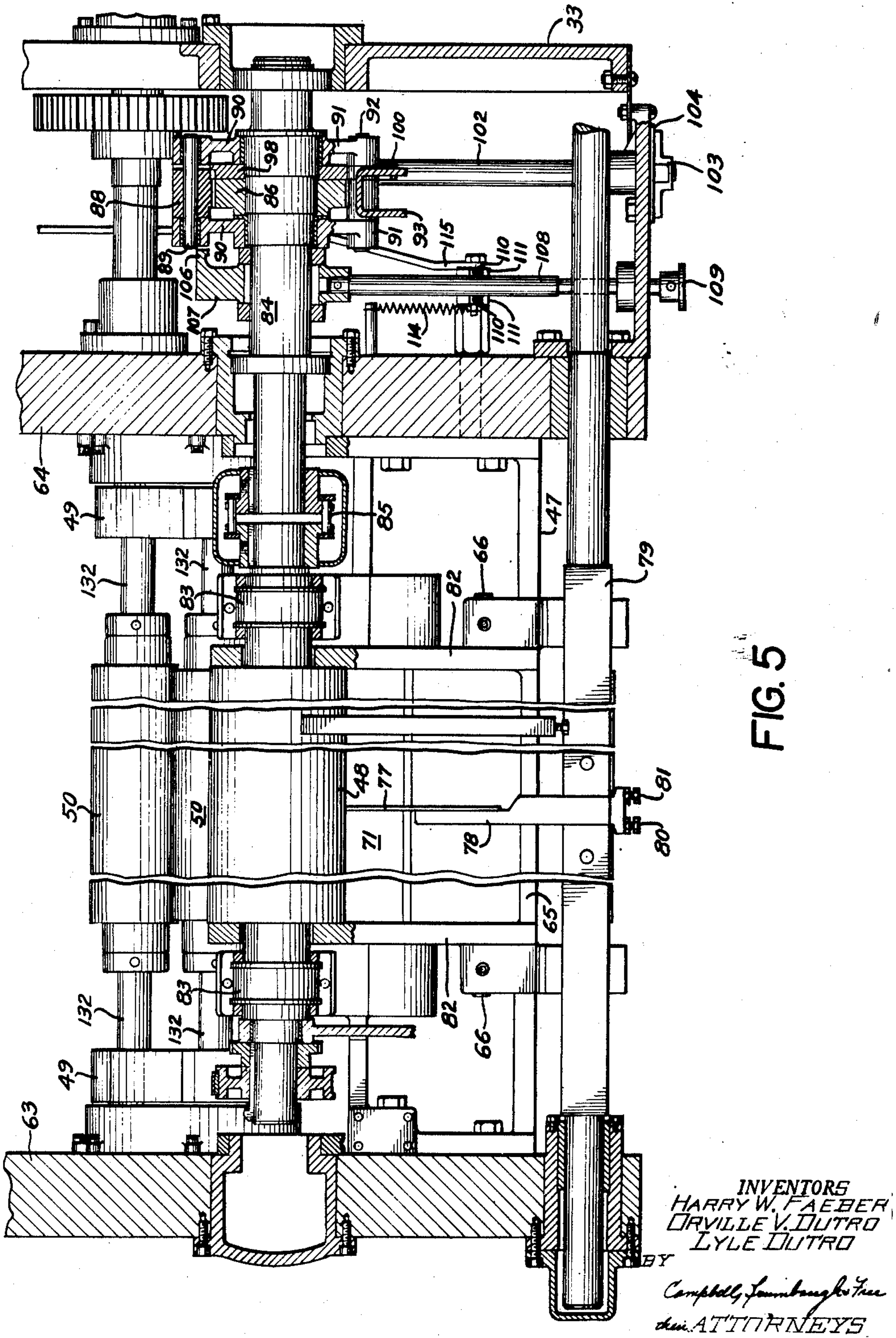
Figure 5 is a view in section, taken on the broken line 5—5 of Figure 4, and looking in the direction of the arrows, this view illustrating the drive mechanism for the fountain roll.
Figures 6, 7:
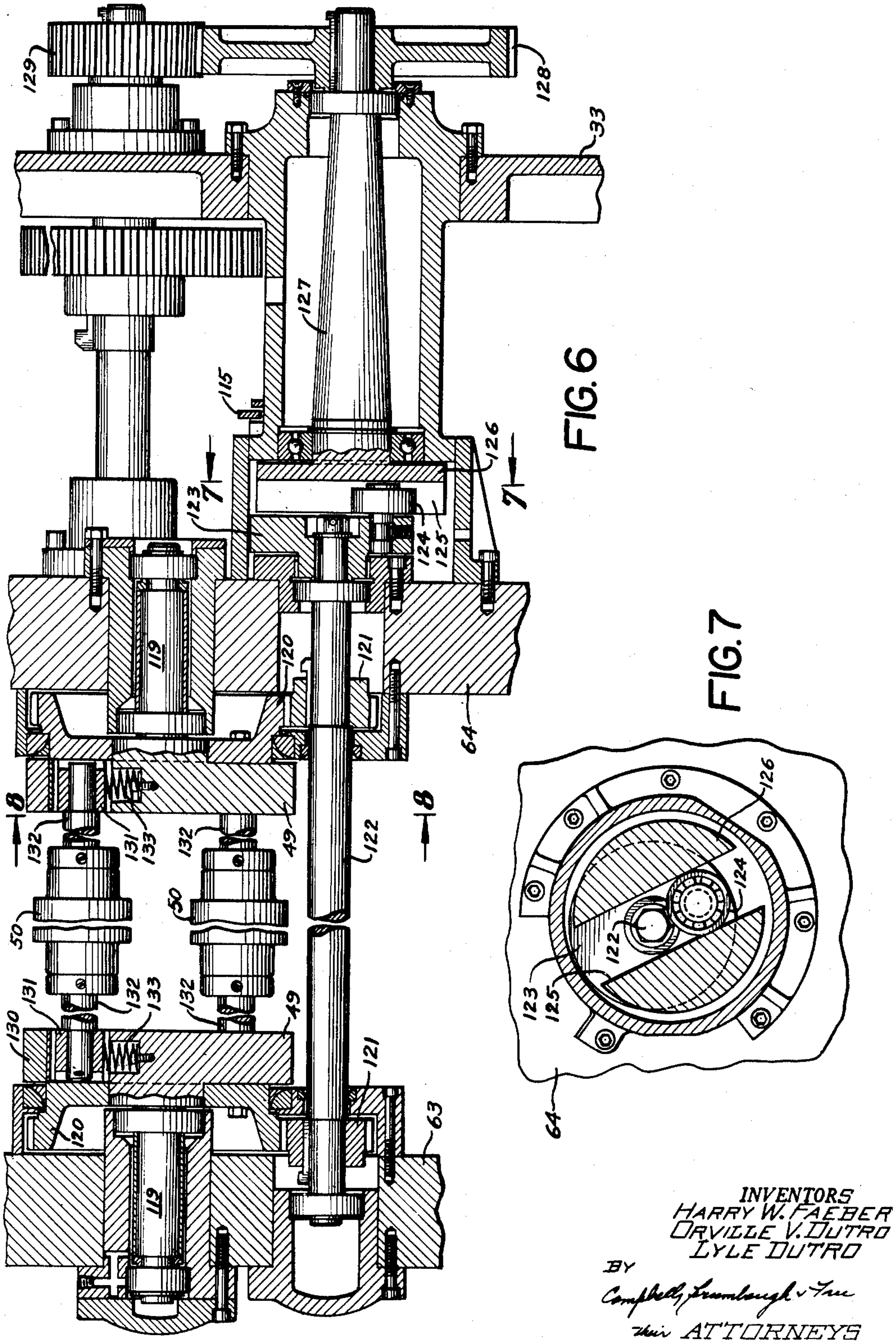
Figure 6 is a view in section, taken on the line 6—6 of Figure 4, and looking in the direction of the arrows, this view illustrating the drive mechanism for the ductor roll.
Figure 7 is a view in section, taken on the line 7—7 of Figure 6, and looking in the direction of the arrows.
Figure 8:
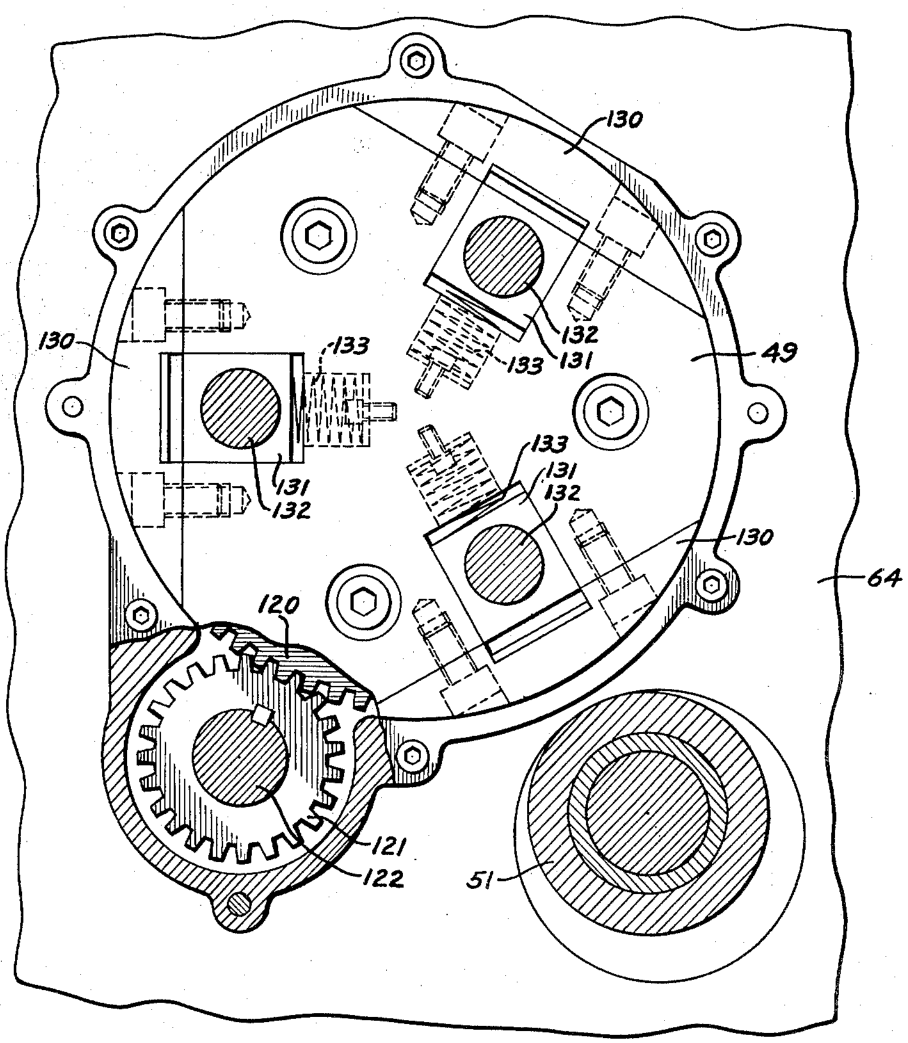
Figure 8 is a view in section, taken on the line 8—8 of Figure 6, and looking in the direction of the arrows, this view illustrating the structure of the ductor roll.
Figure 9:
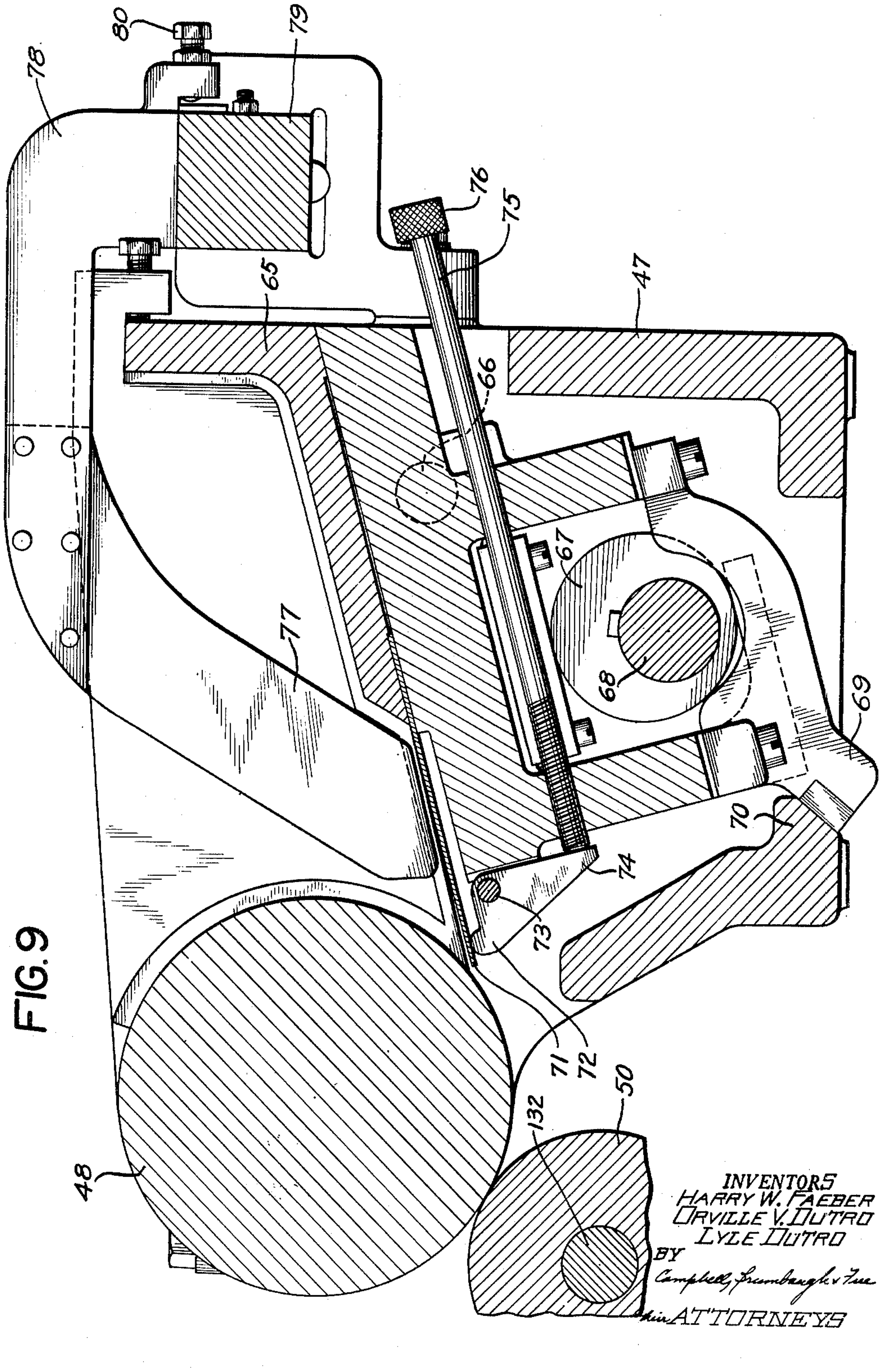
Figure 9 is an enlarged view in section, taken on the line 9—9 of Figure 1, and looking in the direction of the arrows, this view illustrating the details of the fountain structure.

Returning to the source of supply of ink mounted in the fountain support 47, and referring particularly to Figures 1, 5, and 9, an ink fountain is illustrated at 65, being pivotally mounted upon trunnion bearings 66 and pivotally moved about such bearings by means of a cam 67 mounted upon a cam shaft 68. The fountain carries a lug 69 that is adapted to engage a stop member 70 to limit the swinging movement of the fountain and locate it in the proper operating position.

The bottom of the fountain is provided with a flexible blade 71 which terminates adjacent the ink roll 48 and thus permits the roll to take off a desired thickness of ink controlled by the spacing of the roll 48 and the blade 71. This spacing may be varied across the length of the fountain by means of pressure fingers 72 pivotally mounted at 73 and provided with arms 74 that are adapted to be engaged by threaded shafts 75, controlled by knurled operating knobs 76. The position of the rod 75 thus determines the upward pressure on the blade 71 by the fingers 72 and serves as a means for controlling the spacing of the blade from the roll 48. By providing a sufficient number of pressure fingers 72, the spacing of the blade longitudinally of the ink roll 48 may be controlled along the entire length of the roll and thus a desired thickness of ink film is furnished to the ink distributing system across the entire width thereof.

In order that the ink within the fountain 65 may be continuously agitated, paddles 77 are provided, each paddle being mounted upon a bracket 78 that is pivoted upon a transversely reciprocating shaft 79. The pivotal motion of the brackets 78 is controlled by means of laterally spaced set screws 80 and 81.

Rotation of the ink roll 48 is accomplished intermittently in the following manner (Figures 5, 10, 11, 12, and 14). The shafts of the roll 48 extend through the end walls 82 of the link fountain (Figure 5) and are journaled in bearings 83 carried by the fountain support structure 47. The end walls 82 are cut away to permit the swinging or pivotal movement of the fountain about the trunion 66 with respect to the shafts of the ink roll 48.

Figure 10:
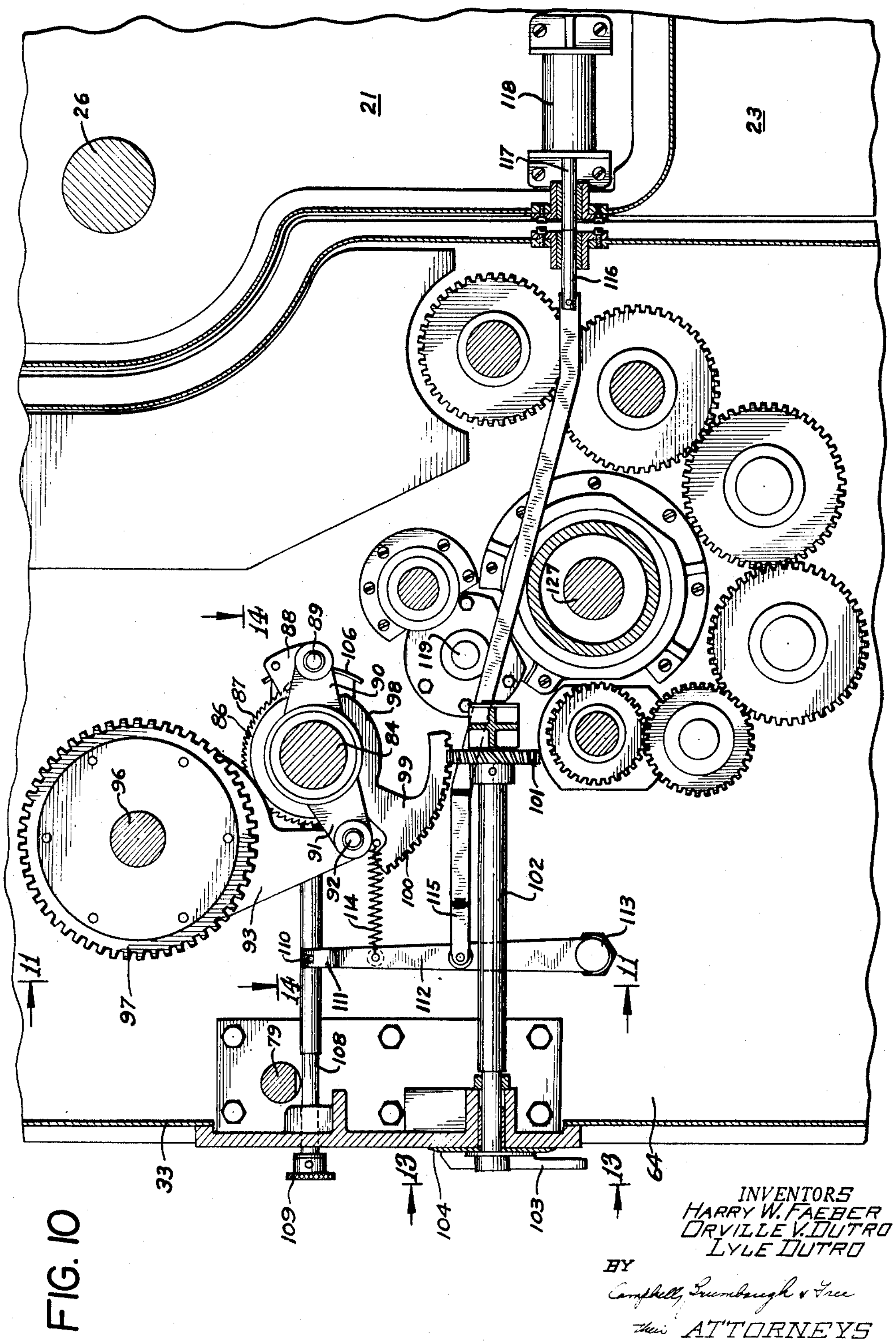
Figure 10 is a view in section, taken on the line 10—10 of Figure 1, and looking in the direction of the arrows, this view illustrating the drive mechanism for the various rollers of the ink distribution system and also of the fountain ink roll.
Figure 11:
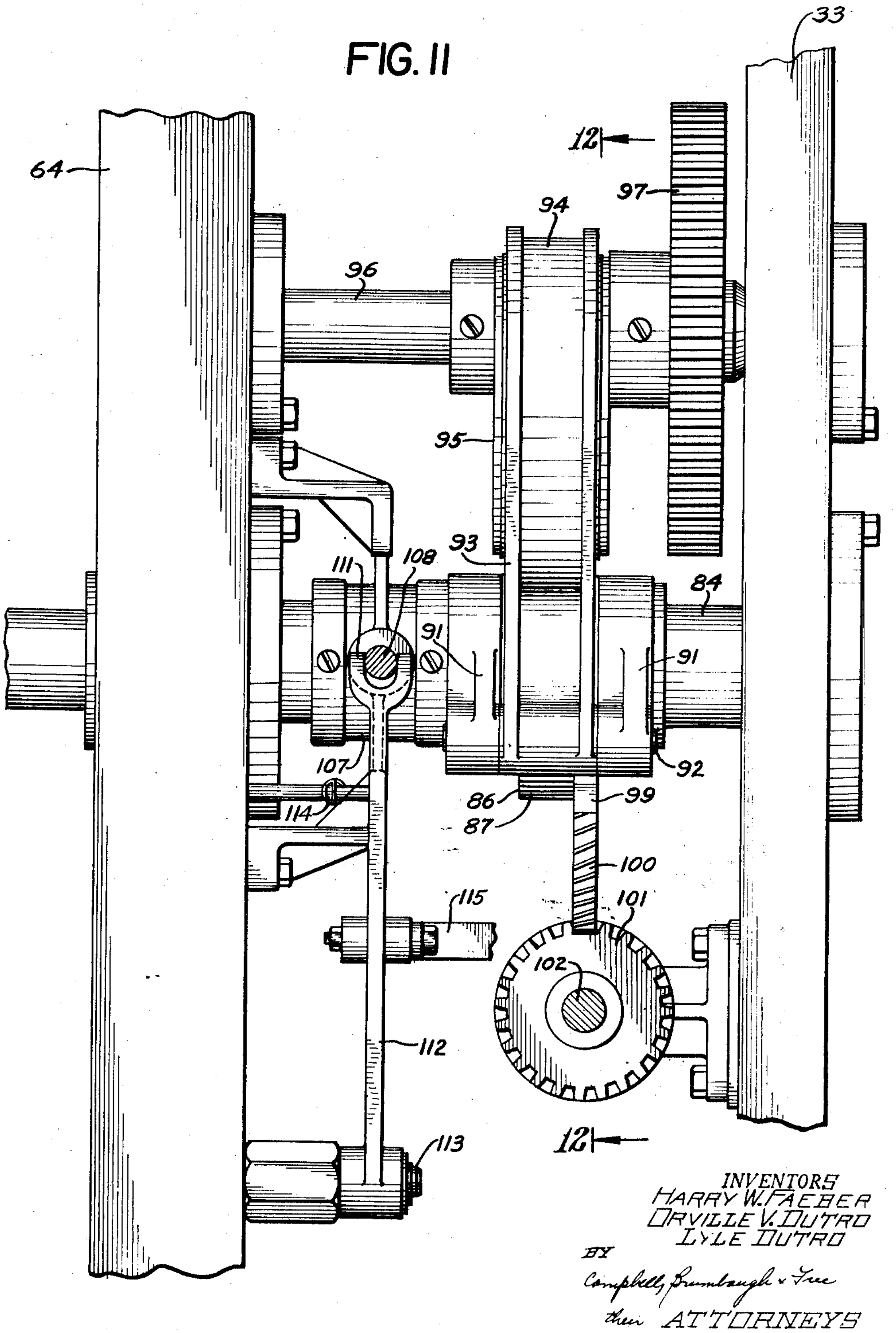
Figure 11 is a view in section, taken on the line 11—11 of Figure 10, and looking in the direction of the arrows, this view illustrating the details of the ratchet drive mechanism for the fountain roll.
Figures 12, 13:
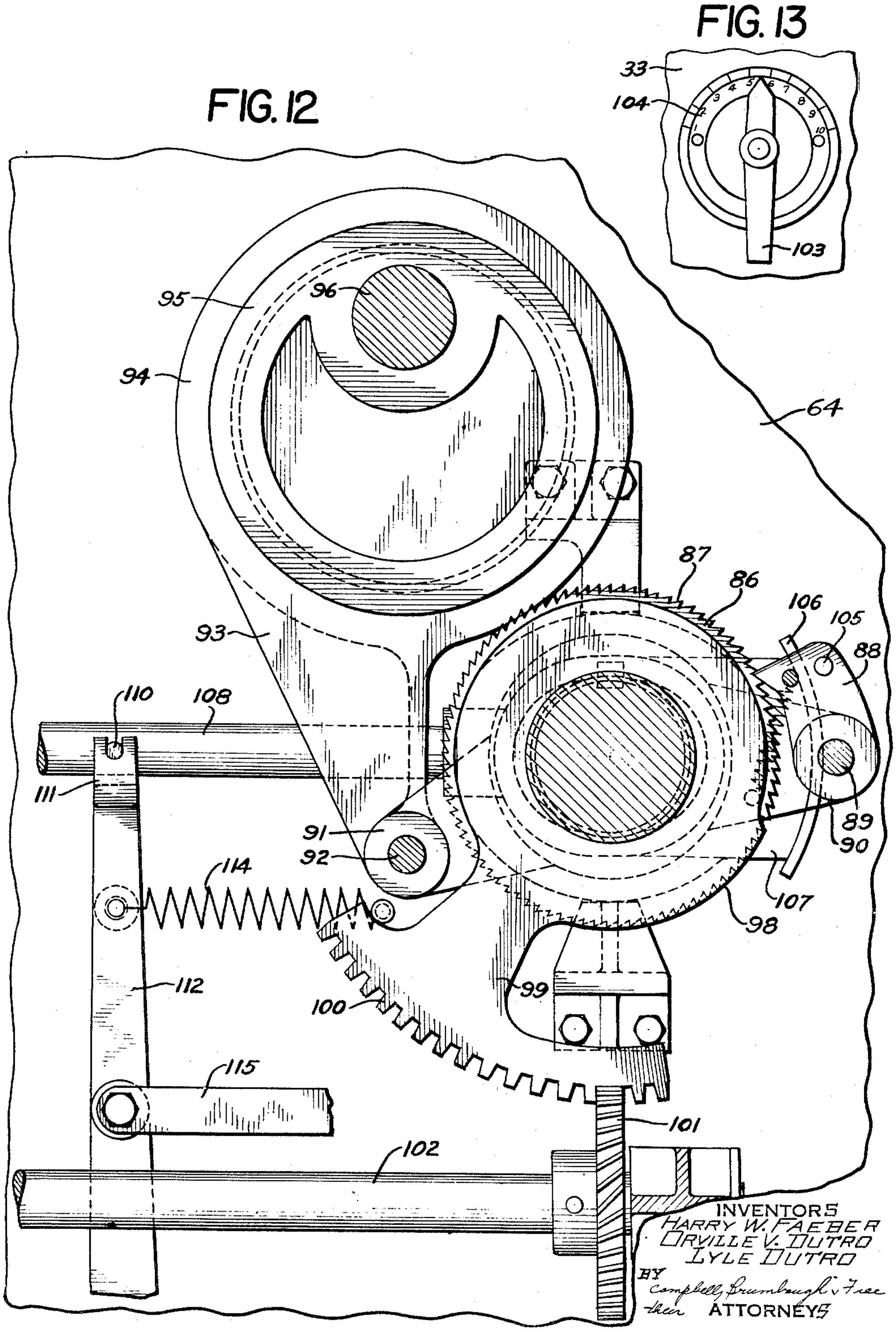
Figure 12 is a view in section, taken on the line 12—12 of Figure 11, and looking in the direction of the arrows.
Figure 13 is a detail view in end elevation, taken on the plane 13—13 of Figure 10, and looking in the direction of the arrows.

A shaft section 84 is journaled in the end wall 64 of the carriage 33 and is coupled to the shaft of the ink roll 48 by means of a coupling 85. Upon the shaft 84 a drive disc 86 is secured, the periphery of the drive disc being provided with ratchet teeth 87, as illustrated in Figure 12. The ratchet teeth are engaged by a pawl 88 that is pivotally mounted upon a shaft 89 carried between spaced arms 90. The arms 90 are journaled upon the shaft section 84 and are provided with arms 91 connected by a pivot pin 92 to which a connecting rod 93 is pivoted, the rod 93 being formed upon an eccentric follower 94 mounted upon an eccentric 95 that is secured to a shaft 96. Shaft 96 is driven by a drive gear 97, as illustrated in Figure 10. Rotation of the shaft 96 thus causes the arm 93 to reciprocate and to move the pawl member 88 back and forth over the ratchet teeth 87 formed on the disc 86. The extent of the movement of the pawl member 88 during which its tooth engages a tooth on the ratchet disc 86 is controlled by a dwell control cam 98 that is journaled upon the shaft 84 and is provided with an arm 99 having a gear sector 100 that is engaged by a mating gear 101 carried upon a control shaft 102. The control shaft is operated by an operating arm 103 that moves over a dial 104 and thus serves as a convenient means for indexing the operation of the cam 98.

In order that turning of the ink roll 48 may be completely arrested, the pawl 88 is provided with a pin 105 that is adapted to be engaged by a push plate 106. The push plate 106 is mounted upon a frame 107 that encompasses the shaft 84 and is actuated by a shaft 108 that may be manually operated by means of a manually operable knob 109. The shaft 108 is also provided with pins 110 that are engaged by a yoke 111 carried by an arm 112 pivoted at 113. The arm 112 is normally urged to the right, as viewed in Figures 10 and 12, by means of a spring 114 and has pivotally connected thereto a push rod 115 that is provided with a push pin 116 at the right, as viewed in Figure 10. In the normal operating position of the carriage 33, the push pin 116 strikes a pin 117 carried upon a piston within a cylinder 118. Fluid pressure is normally provided within the cylinder 118 to maintain the pin 117 in the position illustrated in Figure 10. Relief of fluid pressure within the cylinder 118 permits the pin 117 to move to the right as viewed in Figure 10, and thus permits the push plate 106 to engage the pin 105 and disengage the pawl 88. Such automatic operation may be accomplished by suitably controlling the pressure within the cylinder 118. During normal operation, however, the pin 117 is maintained in the position illustrated in Figure 10, so that when the carriage 33 is moved into its normal operating position, the pawl 88 will be permitted to engage the teeth 87 and advance the fountain roll in the direction illustrated in Figure 3.

The structure of the ductor mechanism will now be described in detail, reference being made particularly to Figures 3, 6, 7, and 8. The ductor mechanism utilizes independently mounted end plates 49 within which are journaled ductor rolls 50. Each end plate 49 is provided with a stub shaft 119, journaled in the respective end walls 63 and 64 of the carriage 33. Each end plate 49 is also provided with a ring gear 120, the ring gear 120 being engaged by driving pinions 121, secured to a drive shaft 122. The drive shaft 122 is provided with an end plate 123 upon which a drive roller 124 is journaled. The drive roller is received within a slot 125 formed in a disc 126 that is formed upon a shaft section 127. The axis of shaft section 127 is offset with respect to the axis of the drive shaft 122, and the shaft section 127 is driven by a gear 128 engaged by a driving gear 129 that is driven from the related power supply mechanism carried by the carriage 33. The offset relationship of the axes of shafts 122 and 127 results in a pulsating drive of the ductor, the design being such that there will be three rapid motions of the ductor during each revolution thereof, these motions being alternated with three periods of slow movement. The structure is such as to cause the periods of slow movement to occur when the rollers 50 are in engagement with the respective rolls 48, 51, and 53, as illustrated in Figure 3.

The end plates 49 are provided with segmental sectors 130 which are suitably secured in position and which serve as bearing caps to retain in proper position bearings 131 provided for each end of the shafts 132, upon which the ductor rollers 50 are mounted. Springs 133 are provided to urge the bearings 131 outwardly and thus permit a yielding contact to take place between the rollers 50 and the respective rollers 48, 51, and 53. In the operation of the mechanism, as will be readily understood from the foregoing, the ductor rollers 50 dwell in contact with the ink roll 48 during their period of slow motion and are thus furnished with ink by the ink roll. The ductor is then advanced rapidly by a pulse from the drive mechanism as above described, and the roller next comes in contact with the vibrator roller 51. At this point the ink on the roller 50 is distributed more uniformly across its length.

The next pulse movement of the ductor brings the roll 50 into contact with the swing roll 53 which thus receives a supply of ink from the ductor roller 50 and starts that supply of ink in its travel to the form cylinder.

The travel of the ink from the swing roller 53 to the various vibrator and distrbuting rollers, as illustrated in Figure 3, will be readily apparent from that figure of the drawings, and it will thus be seen that the form cylinder 26 is effectively inked by the several form rollers 57, 58, 61, and 62.

The relationship between the various rollers of the distributing system is capable of careful control by the mechanism illustrated in Figures 1, 4, 15, 16, and 17. In this connection, to simplify the description, the shafts of the rollers 53 to 62, inclusive, are given the same reference characters that have been applied to the respective rollers in connection with the discussion of Figure 3. Accordingly, referring particularly to Figure 4, it will be seen that the swing roll shaft 53 is mounted upon a support 134 that is journaled about the axis of a drive shaft 135. An operating shaft 136 is journaled about the axis of shaft 53 and slidably mounted in a fitting 137 that is provided with a follower plate 138. An operating arm 139 is adapted to engage the follower plate 138 and is pivoted about a shaft 140 which is provided with a crank arm 141. A link 142 is pivoted to the extremity of arm 141 and to the extremity of a crank arm 143 which is mounted upon a manually operated shaft 144. An adjustable stop 145 on the shaft 136 provides means for confining the operating end of arm 139 and thus affords a convenient means of providing an initial setting or adjustment of the swing roller 53 with respect to the ductor rolls 50 and vibrator roll 54.

The vibrator roll 54 is mounted upon brackets 146 which are journaled about the axis of roll 55 and have pivotally connected thereto adjusting rods 147 which are received in stationary brackets 148 and secured in adjusted position by means of nut 149.

Set screws 146′ permit the adjustment of the position of shaft 54 in a manner similar to that described in connection with shaft 57.

The roller 59 is journaled in brackets 150 which have connected thereto adjusting rods 151, the positions of which are controlled by adjusting nuts 152 in a manner similar to adjusting rods 147. Shaft 59 is normally urged outwardly of the bracket 150 by means of springs 153, and the position of the shaft is adjusted by means of bolts and lock nuts shown at 154. The latter are mounted in pivoted blocks 155 which are secured to the brackets 150 by means of bolts 156.

The form roller shaft 57 is mounted in a bracket 157 by means of pivoted blocks 158 which are secured in position by bolts 159, and the position of shaft 57 is controlled by springs 160 and adjusting screws 161. The brackets 157 are provided with arms 162 to which are connected operating rods 163 that are controlled by mechanism presently to be described. Form roller shaft 58 is journaled in brackets 164 in a manner similar to form roller shaft 57, the position of shaft 58 being controlled by set screw 165. The brackets 164 are provided with crank arms 166 which are actuated by control rods 167 and operated in a manner similar to operating rods 163.

Form roller shaft 61 is journaled in brackets 168 similarly to shafts 57 and 58, and the position of shaft 61 is controlled by set screws 169. The brackets 168 are provided with lever arms 170 to which are connected operating rods 171 that are controlled in a manner similar to operating rod 163.

Form roller shaft 62 is journaled in brackets 172 in a manner similar to the previously described form rollers, and the position of shaft 62 is controlled by set screws 173. It is to be observed that each of the shafts 54, 57, 58, 59, 61, and 62 are urged in one direction by springs similar to springs 160 that have been described in connection with shaft 57, these springs being opposed by the several set screws that have been referred to above. The bracket 172 is provided with a lever arm 174 to which is connected an operating arm 175 which is actuated similarly to the operating rod 163.

Referring to Figures 15, 16, and 17, the manner in which the operating rods 163, 167, 171, and 175 are actuated will now be described. In this connection, operating rod 163 is used for purposes of illustration. The rod is formed with a threaded extremity 176 on which a shaft section 177 is received. The shaft section is provided with a peripheral abutment 178 against which bearing races 179 are received, the bearings being positioned by retainer rings 180. The retainer rings are mounted upon a stationary bracket 181 that is mounted upon the side wall of the carriage 33. Shaft section 177 is journaled within a bearing 182 and is provided with a fitting 183 having a yoke-shaped extremity 184 within which a roller 185 is journaled. An operating yoke 186 engages the roller 185, being mounted upon an operating shaft 187. Operating shaft 187 is formed with a squared end 188 having a dial 189 and is journaled in an outer cover plate 190 carried by the carriage 133, and on the inner side of the cover plate, the shaft 187 has secured thereto a locking disc 191. A locking finger 192 is carried by a threaded shaft 193 which is turned by a knurled manually operated knob 194, thus to lock the shaft 187 in any desired position.

Behind the dial 189 an indexing disc 195 is provided, the disc being provided with a suitable indexing mark 196. The disc 195 is locked in any desired position by means of a set screw 197 provided with a manually operated knob 198. The set screw thus provides a convenient means for locking the disc 195 in any desired position to furnish a desired indexed setting for the form rollers. Any suitable fitting may be applied to the squared end 188, and when the knurled knob 194 is released, the shaft 187 may be turned as desired.

Figure 4:
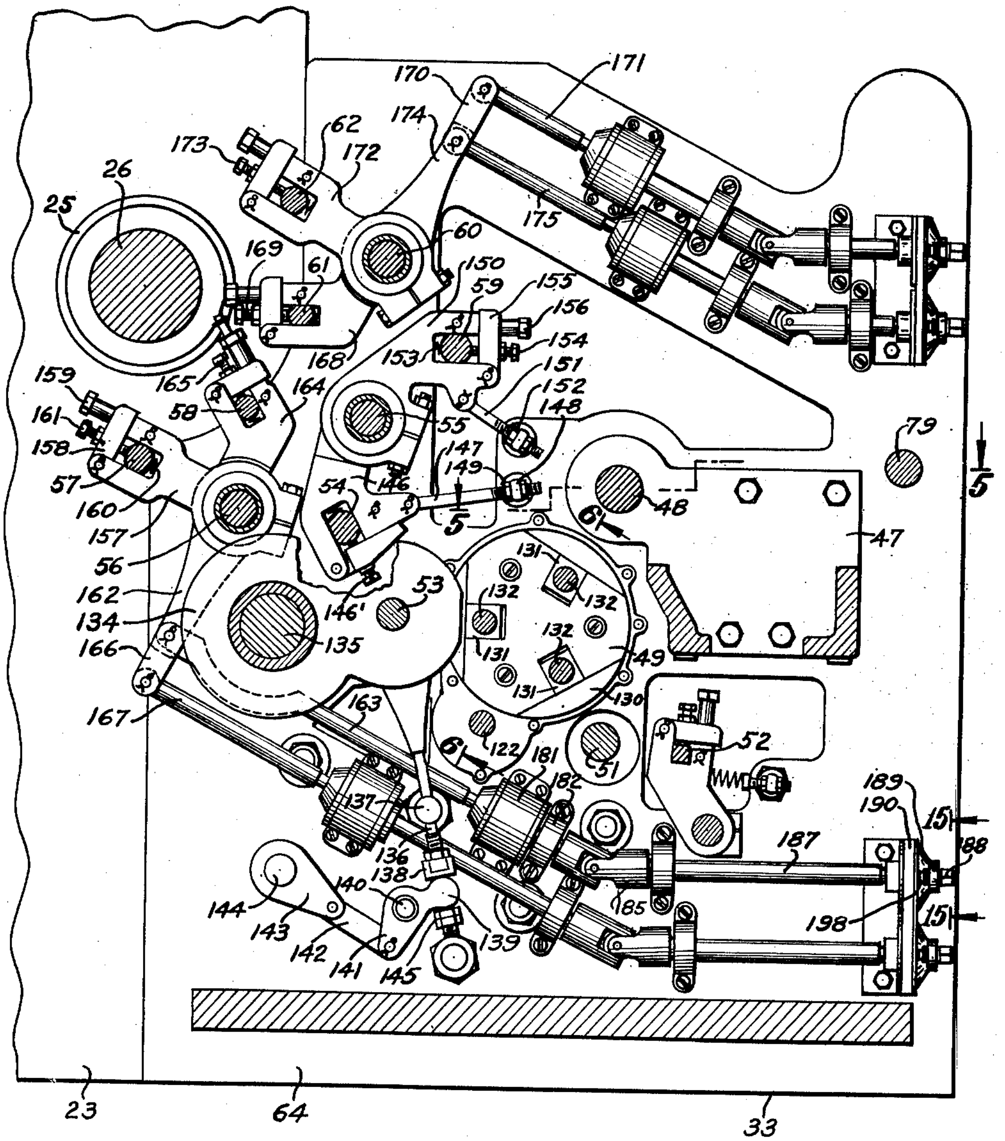
Figure 4 is a view in vertical transverse section, taken on the line 4—4 of Figure 1, and looking in the direction of the arrows, this view illustrating the various mechanisms for adjusting the contacting relationships of the various rollers of the ink distribution system.

Referring to Figure 4, the relationship of the various form rollers with respect to their vibrating rollers 56 and 60 is first adjusted by the set screws 161, 165, 169, and 173. The relationship of the form rollers with respect to the plate cylinder is next adjusted by the manual operation of the respective operating rods 163, 167, 171, and 175. In this connection, when the shaft section 177 is turned, the threaded connection 176 thereof with the operating rods causes the operating rods to be moved axially. This will be readily apparent from Figure 17, and thus the position of the form rollers with respect to the plate cylinder is effectively controlled.

Having adjusted the position of the form rollers with respect to the vibrator rollers and the plate cylinder, the position of the roller 59 with respect to rollers 55 and 60 may be adjusted. Set screws 154 provide an adjustment of the roller 59 with respect to roller 55 while operating rods 51 with the lock nuts 152 provide an effective adjustment of the roller 59 with respect to roller 60.

The position of roller 54 with respect to roller 55 is controlled by set screws 146′ in a manner which will be readily apparent, while the position of the roller 54 with respect to roller 56 is controlled by the operating rods 147. It will thus be seen from the foregoing description that an accurate and effective adjustment is provided for each of the rollers in the ink distribution system with respect to adjacent contacting rollers. Where a roller is to be adjusted with respect to more than one roller, the structure is such that the adjustment with respect to one of such other rollers does not disturb the adjustment of that roller with respect to the other of such rollers, and in this respect the entire mechanism may be quickly and effectively set for any desired operating condition. By means of the manually controlled squared ends 188 of the several control rods, each of the form rollers may be accurately and independently adjusted with respect to the form cylinder and, having once been adjusted and the indicating dial set for a desired condition of operation, the several form rollers may be retracted to an inoperative position or set at their operative position at will and without affecting the operation of any of the other rollers of the distribution system.

The ductor mechanism by means of which ink is transferred from the fountain roll 48 to the swing roll 53 is of such character as to provide an accurately measured quantity of ink transferred by each ductor roller 50 to the swing roller 53. The sub-distribution system serves to distribute the ink more uniformly on the ductor rollers, and the operation of the ductor is such that the rotation of disk 49 (Figure 4) is periodically slowed down to permit the ductor rollers to remain in contact with the respective rollers 48, 51 and 53 for a short period every time they pass by one of these rollers.

It is to be noted that where it has been stated herein that certain rollers are in contact with other rollers, actual physical engagement is not necessarily intended to effect proper transfer of ink, the rollers may be slightly out of actual physical contact.

While the invention has been described with specific reference to the structure shown in the accompanying drawings, it is not to be limited save as defined in the appended claims.

We claim:

1. Ductor mechanism for transferring liquid from a supply roller to liquid distributing rollers comprising a plurality of ductor rollers for transferring liquid from the supply roller to the distributing rollers, a rotatable element upon which the ductor rollers are mounted, and pulsating rotary drive means to rotate the last named element relatively rapidly during travel of the ductor rollers between the supply and distributing rollers and relatively slowly during movement of the ductor rollers into contact and while in contact with said supply and distributing rollers.

2. Ductor mechanism for transferring liquid from a supply roller to liquid distributing rollers comprising a plurality of ductor rollers for transferring liquid from the supply roller to the distributing rollers, a rotatable carriage, means to mount the ductor rollers resiliently on the carriage, and pulsating rotary drive means to rotate the carriage relatively rapidly during travel of the ductor rollers between the supply and distributing rollers and relatively slowly during movement of the ductor rollers into contact and while in contact with said supply and distributing rollers.

3. Ductor mechanism for transferring liquid from a supply roller to liquid distributing rollers comprising three ductor rollers for transferring liquid from the supply roller to the distributing rollers, a rotatable carriage, means to mount the ductor rollers on the carriage resiliently, sub-distribution rollers into engagement with one of which the ductor rollers move, and pulsating rotary drive means to rotate the carriage relatively rapidly during travel of the ductor rollers between the supply, sub-distributing, and distributing rollers, and relatively slowly during movement of the ductor rollers into contact and while in contact with said rollers.

LYLE DUTRO.
HARRY W. FAEBER.
ORVILLE V. DUTRO.

REFERENCES CITED

The following references are of record in the file of this patent:

UNITED STATES PATENTS

| Number | Name | Date |
|---|---|---|
| 441,790 | Cox | Dec. 2, 1890 |
| 1,210,559 | Story | Jan. 2, 1917 |
| 1,376,983 | Walser et al. | May 3, 1921 |
| 1,450,270 | Walser et al. | Apr. 3, 1923 |
| 1,450,370 | Walser et al. | Apr. 3, 1923 |
| 1,627,483 | Claybourn | May 23, 1927 |
| 1,717,737 | Schlesinger | June 18, 1929 |
| 1,945,498 | Avery | Jan. 30, 1934 |
| 1,963,042 | Avery | June 12, 1934 |
| 2,004,801 | Sheppard | June 11, 1935 |
| 2,054,830 | Osborn | Sept. 22, 1936 |
| 2,425,529 | Harless | Aug. 12, 1947 |